Nov. 2, 1943.   W. A. ATWOOD   2,333,459
ELECTRIC CIRCUIT BREAKER
Filed Sept. 9, 1942   2 Sheets-Sheet 2
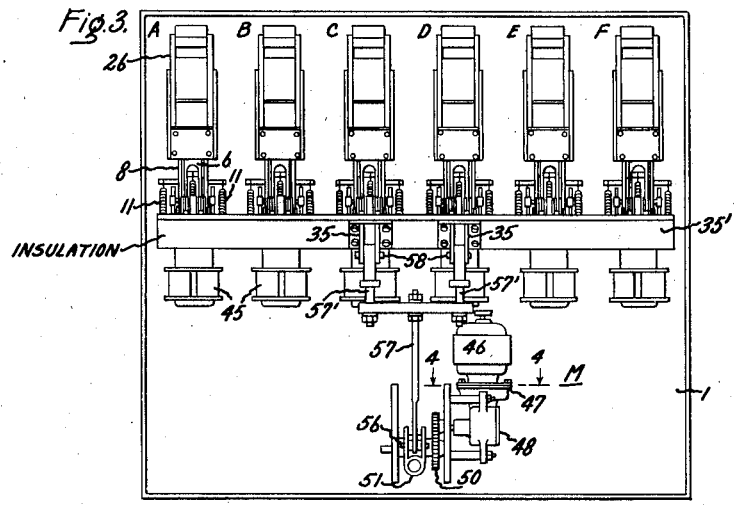
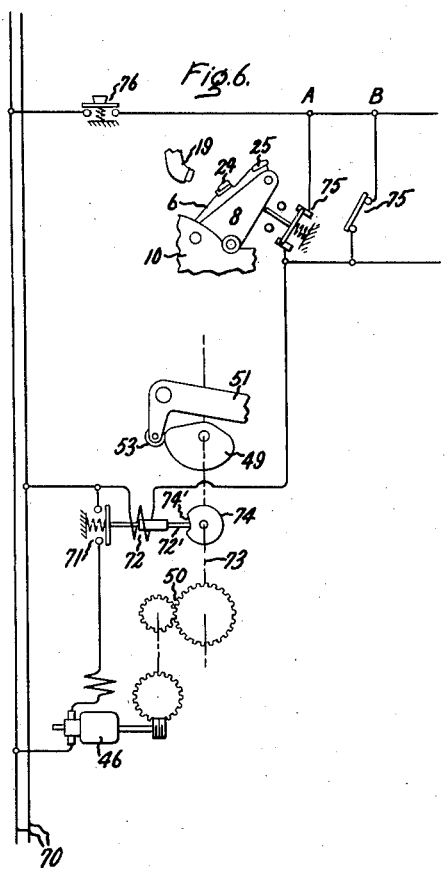
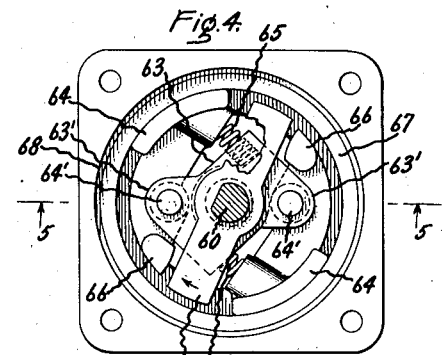
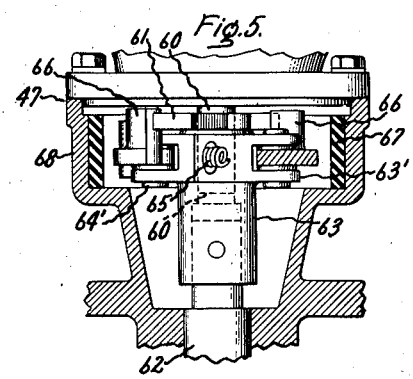
Inventor:
Winfield A. Atwood,
by Harry E. Dunham
His Attorney.

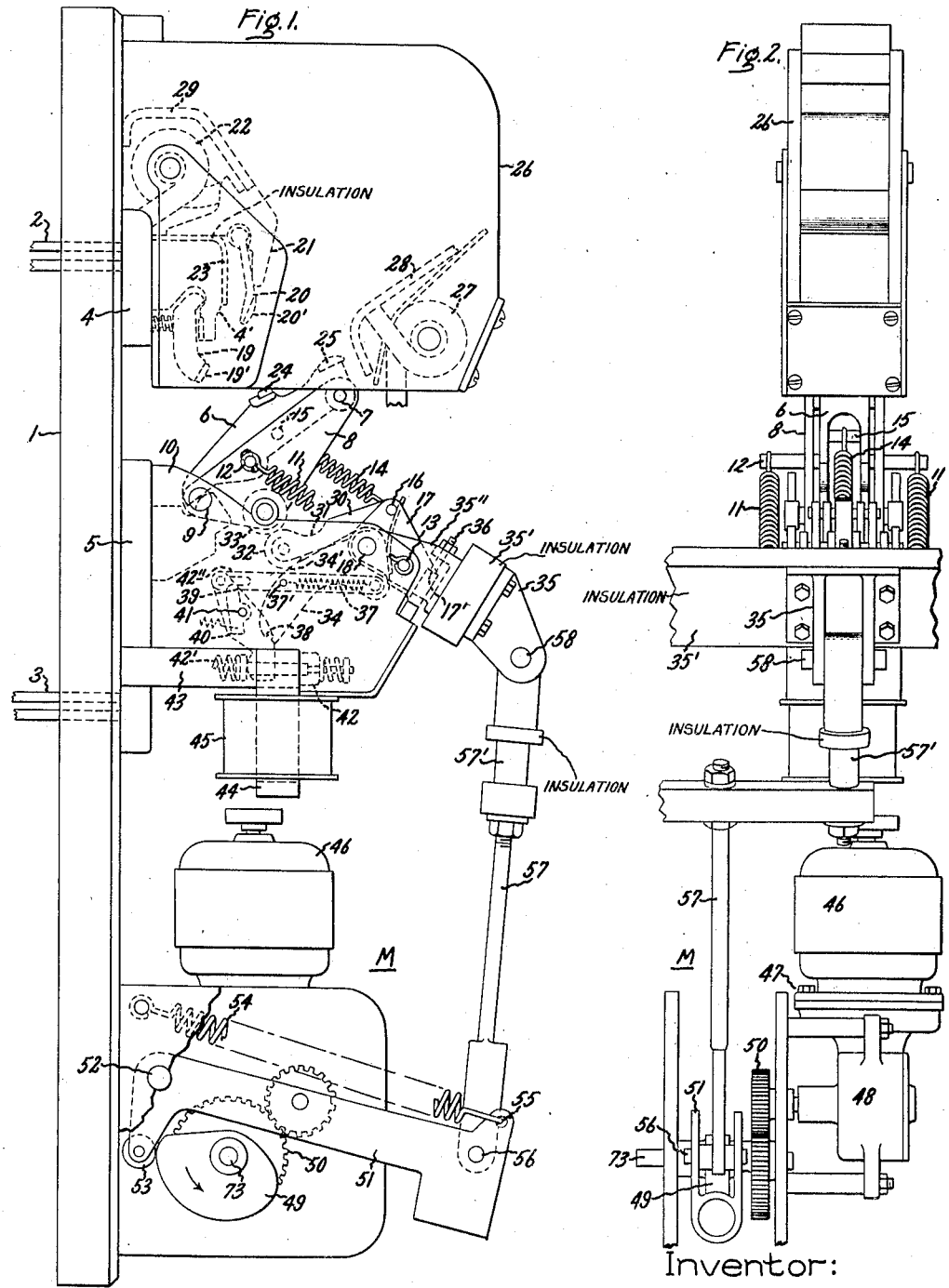

Patented Nov. 2, 1943

2,333,459

UNITED STATES PATENT OFFICE 2,333,459

ELECTRIC CIRCUIT BREAKER

Winfield A. Atwood, Yeadon, Pa., assignor to General Electric Company, a corporation of New York Application September 9, 1942, Serial No. 457,696

8 Claims. (Cl. 200—92)

My invention relates to electric circuit breakers of the multiple-pole type, more particularly to multiple-pole circuit breakers adapted for selective single-pole operation and the operating mechanism therefor.

It has been proposed to operate a multiple-pole circuit breaker by a common operating mechanism for selective single-pole tripping and reclosing, the arrangement being such that one or more poles can trip open independently of each other and the operating mechanism in response to a fault condition on the corresponding phase or phases. The aforesaid pole or poles may be reclosed by the operating mechanism without disturbing the remaining unaffected poles. Single pole operation of this character is desirable for controlling arc-back faults in the anode circuits of mercury arc rectifiers.

Heretofore the operation of such multiple-pole breakers has not been entirely satisfactory due mainly to the closing characteristics of the operating mechanism. That is, an operating mechanism with series motor characteristics, for example, might handle the full load of closing simultaneously all poles of the breaker quite satisfactorily so that all poles are closed firmly and without excessive jarring force, whereas the same mechanism might close a single pole of the breaker with such speed and slamming force that strains and undesirable stresses are set up in the mechanism and breaker structure. If, on the other hand, conventional constant-speed motors are considered, the "pick-up" may be too slow and the torque characteristics would be distinctly unfavorable for breaker operation. An example of practical problems that must be met is the possibility of "stalling" of the motor mechanism at some point in the closing cycle where the duty is very heavy. This may be due to a temporary loss of voltage, or other factors. In any event, the starting torque characteristics must be such that the motor mechanism can instantly pick up the load and carry through to complete the closing stroke from any intermediate point in the closing cycle. Furthermore, the closing operation must be completed without injury to the breaker structure or its operating mechanism regardless of whether the closing load consists of one or all poles of the breaker.

Although the problem has previously been attacked by designing the closing motor especially for the full closing load of all poles, and then opening all poles following a fault on one or more phases so that all poles can be reclosed simultaneously with even force, it is apparent that this method is not wholly desirable because of the unnecessary opening of unaffected phases.

It will therefore be appreciated that the problem of evenly and safely closing a six-pole air circuit breaker for use in power rectifier anode circuits, for example, regardless of whether one, several or all six poles are to be closed, is of considerable magnitude.

The principal object of my invention, therefore, is the provision of an improved circuit breaker of the multiple-pole type that is effective selectively to close or reclose one or more poles of the breaker evenly, uniformly and positively and without excessive force and vibration.

My invention will be more fully set forth in the following description referring to the accompanying drawings, and the features of novelty which characterize my invention will be pointed out with particularity in the claims annexed to and forming a part of this specification.

Referring to the drawings, Fig. 1 is an elevational view, partly broken away, of a single pole of a multiple-pole air circuit breaker including its closing mechanism embodying my invention; Fig. 2 is an elevational end view of the single pole structure shown by Fig. 1; Fig. 3 is a general front view, showing in elevation a 6-pole motor operated air circuit breaker embodying my invention; Fig. 4 is an enlarged plan view taken along the line 4—4 of Fig. 3; Fig. 5 is an elevational view partly in section taken along the line 5—5 of Fig. 4; and Fig. 6 is a diagrammatic illustration of control means for the circuit breaker.

The multiple-pole air circuit breaker illustrated by way of example in Figs. 1 and 3 is a six-pole, high-speed magnetic blowout circuit breaker particularly adapted for controlling the anode circuits of a mercury arc rectifier. This type of circuit breaker must open very fast in order to interrupt fault currents, such as reverse flow or arc-back currents which may increase in magnitude at the rate of several million amperes per second, before such currents reach dangerous values. Each pole of the breaker can be closed and tripped independently of the other poles and unnecessary mass in the circuit breaker contact and mechanism structure is avoided in order to reduce inertia and facilitate high-speed opening.

The circuit breaker contact and mechanism single-pole structures of such a breaker are described in detail and claimed in my Patent 2,328,942, granted September 7, 1943, and assigned to the same assignee as the present invention, and will now be described in respect to the essential operating features, reference being made to Figs. 1 and 2. It should be understood, however, that other types of single-pole circuit breakers having suitable arc extinguishing, current carrying and opening characteristics, may be used in place of the single-pole breaker structure herein described.

Referring particularly to Fig. 1, the circuit breaker is suitably mounted on an insulating panel 1 which is provided with terminals 2 and 3 (for each pole of the breaker) connected through the panel to the vertically spaced contact studs 4 and 5, respectively, on the panel front. In the closed circuit position of the breaker the contact studs are electrically bridged and interconnected by a movable contact member 6. The member 6 is pivotally carried at 7 on a supporting cradle 8 that is in turn pivotally mounted at 9 on the stationary supporting frame structure 10. The member 6 and the cradle 8 are biased by tension springs 11 toward open circuit position, one end of each spring being connected at 12 to the member 6 and the other end to studs 13 in the fixed supporting frame 10. The movable contact member 6 is further biased toward open position of the breaker by a dual purpose tension spring 14, and counterclockwise with respect to its pivot at 7. Springs 11 and 14 are also used to urge the lower end of the contact member into conducting engagement with a portion of the contact stud 5 as indicated. The spring 14 is connected at one end to an intermediate part of the contact member 6 at 15 and at the other end 16 to a member 17 pivotally mounted at 18 on the fixed frame 10. The function of the member 17 will be presently described.

The fixed contact structure cooperating with the arcing end of the contact 6 comprises resiliently biased main current-carrying contacts 19 in electrical engagement with a conducting portion 4' of the contact stud 4 and an arcing contact 20 electrically connected through the conducting member 21 to one terminal of the magnetic blowout coil 22. The other terminal of the blowout coil is connected to the contact stud 4. The stud 4 and the arcing contact 20 are insulated from each other at 23 so that the blowout coil 22 normally carries but a portion of the current flowing through the breaker. The blowout coil carries the full current to be interrupted as soon as the main contacts 19 and 24 separate, thereby increasing the excitation of the coil. The current-carrying and arcing contacts 19 and 20 are provided with special contact surfaces 19' and 20', respectively, for coacting with corresponding contacts 24 and 25 carried by the movable contact 6. The arcing contacts above described separate within an arc chute 26 comprising a pair of insulating plates suitably mounted on the panel 1. The arc chute also may have mounted therein a second blowout coil 27 connected to an arcing horn 28 to which the arc can transfer from the movable arcing contact 25 thereby to excite the blowout coil 27 to furnish additional arc blowout force. The cooperating arcing horn is shown at 29 forming an extension of the conducting member 21. It will be apparent that any suitable arc extinguishing structure may be used in connection with the arc chute.

From the above description it will be seen that clockwise rotation of the switch member 6 from the closed circuit position to the open circuit position shown draws the power arc at the arcing contacts 20' and 25 from where it transfers to the arc runners 28 and 29. The arc under influence of the magnetic blowout field is interrupted within the chute 26.

The operating means for the contact 6 comprises a cam device including links 30 that are connected at 16 to the pivoted member 17 above referred to. These links have a camming roller 32 arranged to cooperate with a roller 33 carried by the cradle 8. The roller 32 rides on the cam surface 34' of a movable abutment 34 that is copivotally mounted with the member 17 at 18. In the position shown, the abutment is unlatched and depressed (the mechanism having been tripped but not reset) and the springs 11 hold the contact 6 in the fully opened position.

The resetting operation which must be performed prior to closing the breaker is accomplished by raising a crank structure 35 also pivotally mounted at 18, which has an adjustable stud 36 arranged to abut a shoulder 17' of the member 17, so that the tension spring 14 can rotate the member 17 counterclockwise as the crank is raised. Thereupon, the link 30 is moved along the abutment 34 (toward the left as shown in Fig. 1) until cutaway portions 31 of link 30 slide under the pin for the roller 33. At the same time the abutment 34 is rotated clockwise by its biasing springs 37 one end of each being connected to the fixed frame at 37'. As the abutment is raised to follow the roller 32, its latching end 38 is engaged by a detent 39 of a latch member 40 that is pivotally mounted on the frame at 41. The latch member 40 is in turn actuated by the release of a spring biased armature 42 arranged to coact with common pole pieces for magnets 43 and 44 and flux coils 45. The detail operation of the tripping device is described in my above copending application and it is sufficient here to state that the armature 42 is normally held to its poles against spring bias by magnetic attraction. However, in response to predetermined circuit conditions the magnetic holding field is shifted and weakened so that the spring 42' forcibly moves the armature 42 away from its pole pieces and rotates the latch 40 counterclockwise to release the abutment 34. When the abutment drops down under influence of the breaker reacting forces, it resets the armature 42 through the latch member 40 by means of slotted links 42'' interconnecting the abutment and latch member.

The circuit closing operation is performed by energizing a motor mechanism M suitably mounted on the panel 1 so as to rotate the crank 35 clockwise through a predetermined arc. Since the crank 35 and the member 17 are in abutting engagement and now function as a single lever, the link 30 and its roller 32 are drawn over the abutment cam surface 34' to push the roller 33 upward and close the breaker contact 6. The breaker is held in this closed position until it is tripped by release of the abutment 34, whereupon the contact 6 is opened by its biasing springs and the parts assume the positions shown in Fig. 1.

The motor mechanism M for operating the crank 35 comprises an electric motor 46, preferably of the series field type, although a motor having predominantly series motor characteristics may be used. The motor is connected through an automatic brake and gear reducer indicated generally at 47 and 48 respectively, to a cam 49. The speed of the cam is further reduced by the gearing indicated at 50. The cam 49 coacts with a bell crank 51 that is pivotally mounted at 52 on the frame. The crank is provided with a roller 53 for coacting with the cam 49 and with biasing tension springs 54 interconnecting the frame and one arm of the crank at 55. This arm of the bell crank also is connected at 56 to an operating link 57 having its opposite end connected at 58 to the crank 35.

When the mechanism is in the open circuit position shown, the bell crank roller 53 is on the "high" point of the cam 49. Energization of the motor 46 for resetting and closing the breaker causes the cam 49 to rotate counterclockwise so that the roller 53 can now move under influence of the bell crank spring 54 to the "low" point of the cam. This counterclockwise rotation of the cam permits springs 54 to turn the bell crank and lift the link 57 and crank 35 so as to reset, i. e., relatch, the mechanism in the manner above described. As the cam 49 continues to rotate, the roller 53 is again moved to the high point of the cam causing clockwise rotation of the bell crank, lowering of the crank 35 and closing of the breaker. The motor 46 is deenergized and stopped at the end of the closing operation by a limit switch and by the automatic brake 47 in a manner presently to be described.

The motor mechanism M is adapted to close practically simultaneously a number of breaker poles similar to that shown by Fig. 1, such an arrangement being shown by Fig. 3. The breaker poles indicated at A, B, C, D, E and F are each mounted on the panel 1 and are similar in construction and operation to the breaker pole shown by Fig. 1. The crank 35, partially shown in Fig. 1, actually comprises an operating bar 35' extending across all poles and composed of suitable insulating material such as laminated wood, with a separate crank arm for each breaker pole corresponding to the crank arm 35" of Fig. 1. The link 57 is provided at its upper end with a pair of extension links 57' for more evenly transmitting the closing force to the common crank structure at 35.

It will therefore be seen that the crank structure 35 is common to each and all the breaker poles so that the motor mechanism can gang-close the breaker, i. e., close all the breaker poles or any number thereof by a single common operation, through the agency of the bar 35' and associated structure. For example, let it be assumed that the breaker poles are all closed except one that has just tripped out. Operation of the motor mechanism is then effective, first to reset the mechanism of that breaker pole and then to reclose it without affecting or disturbing in any way the remaining poles that are closed. The same is true if poles B and D for example, or in fact all six poles, were tripped open. Since the mechanism of each pole is trip-free, i. e., the breaker can be independently tripped at any time during a closing operation, no serious damage can result if one or more breaker poles are closed before the fault is removed.

An essential feature of my multiple pole circuit breaker is its ability to close one or two breaker poles, for example, at substantially the same uniform speed as when handling the full load, i. e., all six poles. In view of the fact that electric motors having predominantly series motor characteristics are considered necessary for closing power circuit breakers with sufficient force and speed, previous application of series motors to circuit breakers have been generally limited to cases where the load characteristics vary only through a comparatively narrow range.

In accordance with my invention this problem is solved by the use of an automatic brake of the centrifugal type interposed with respect to the series motor 46 and the common actuating crank structure 35 so as to apply a braking force to the motor when it attempts to "speed up" beyond a predetermined value. This automatic brake is also adapted to transmit the driving force to the cam 49 and quickly to stop the motor when the motor is deenergized.

The means for accomplishing this is illustrated by Figs. 4 and 5. Referring to Fig. 4, the motor armature is provided with a stub shaft 60 on which an impeller member 61 is rigidly mounted for rotation with the motor armature. The load shaft 62, referring to Fig. 5, is separate from the motor shaft 60 and has rigidly mounted thereon a member 63 having offset portions 63' on which are pivotally mounted a pair of brake shoes 64 at 64'. The load shaft member 63 and each brake shoe are also interconnected by compression springs 65, and each brake shoe is provided with a lug 66 disposed in the path of the impeller 61.

In the position of rest shown in Fig. 4 the motor driven impeller is free to move a short angular distance with respect to the brake shoes, and the brake shoes are in turn firmly pressed by the springs 65 into engagement with the brake lining 67 of the brake housing 68. The load cam 49 is thereby prevented from "drifting" upon deenergization of the motor. When the motor is energized, the impeller 61 is rotated clockwise so as to engage the brake shoe lugs 66 and rotate the brake shoes slightly against the spring pressure about their pivots 64' so as to relieve the brake pressure. The motor is now free to drive the load shaft 62 directly through the impeller, brake shoes and the member 63.

If the motor driving torque should suddenly decrease due to deenergization of the motor the springs 65 would immediately force the brake shoes back against the brake lining 67 to stop both the motor and load shaft. If, on the other hand, the motor should speed up due to a comparatively light load of closing but one or two breaker poles, the brake shoes which are unbalanced in mass with respect to their pivots 64' are urged by centrifugal force outwardly toward the brake lining. Since the centrifugal force increases as the square of the speed of rotation, it follows that the braking force will increase rapidly as the speed of rotation tends to increase above a predetermined value, thereby tending to hold the speed of the motor and of the load cam 49 practically uniform regardless of whether one pole or all six poles are to be closed. Accordingly, "slamming in" of one or two breaker poles by a motor designed to handle a much greater load is thereby effectively precluded with my invention and any number of breaker poles can be uniformly closed without sacrificing other desirable closing characteristics.

A simple control scheme for the circuit breaker is diagrammatically shown by Fig. 6 wherein the series motor 46 is connected to a suitable source of control power 70. The motor energizing circuit is provided with a seal-in switch 71 that is adapted initially to be closed by energization of the solenoid 72 and thereupon be held closed during predetermined rotation of the main operating cam 49. The cam shaft indicated at 73 is provided with an auxiliary cam 74 having a notched portion 74' for receiving an extension of the solenoid plunger 72'. The solenoid circuit is in turn controlled by a breaker controlled auxiliary switch 75 and the operative's push button 76. The auxiliary switch 75 functions as a "b" switch, i. e., it is closed when the breaker is open and open when the breaker is closed.

When the operative presses the push button 76 to close one or more poles of the breaker, the solenoid 72 is energized through the auxiliary switch or switches 75 of the open pole or poles. The motor is thereupon energized through the seal-in switch 71 and the cam shaft starts to rotate. The auxiliary cam 74, after initial rotation thereof, holds the switch 71 closed for the remainder of the operating cycle, i. e., until the roller 53 again reaches the high point of the cam. The switch 71 thereupon is opened by its spring bias and the motor is deenergized. The automatic brake above described then functions to stop the motor and cam shaft practically instantly so that the mechanism and control system are in readiness for another closing operation of one or more poles.

Although I have specifically illustrated a series field type motor, it will of course be understood that any electric motor having suitable torque pick-up and speed characteristics may be used as well.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. A multiple pole circuit breaker comprising a plurality of individually operable breaker poles each having separable circuit controlling contacts and tripping means for controlling opening of said contacts, and operating mechanism for said breaker poles including means common to each of said breakers, said means being adapted when actuated to close the contacts of one or gang-close the contacts of a plurality of said breaker poles, said means at any position of said multiple pole breaker permitting tripping and opening of one or more of said breaker poles, an operating motor having predominantly series motor characteristics, and automatic means operatively interconnecting said motor and said common operating means, said means being adapted to apply to said motor a retarding force increasing with the increase in speed of said motor above a predetermined value whereby one or more of said breaker poles can be closed or gang-closed by said motor in substantially the same time.

2. A multiple pole circuit breaker comprising a plurality of individually operable breaker poles each having separable circuit controlling contacts and tripping means for controlling opening of said contacts, and operating mechanism for said breaker poles including means common to each of said breakers, said means being adapted when actuated to close the contacts of one or gang-close the contacts of a plurality of said breaker poles, said means at any position of said multiple pole breaker permitting tripping and opening of one or more of said breaker poles, an operating motor having predominantly series motor characteristics, and automatic means operatively interconnecting said motor and said common operating means, said means through self-adjusting action being adapted to apply to said motor a governing force whereby the speed of said motor is controlled so that a single breaker pole or several of said poles together can be closed by said motor in substantially the same closing time.

3. A multiple pole circuit breaker comprising a plurality of individually operable breaker poles each having separable circuit controlling contacts and tripping means for controlling opening of said contacts, and operating mechanism for said breaker poles including means common to each of said breakers, said means being adapted when actuated to close the contacts of one or gang-close the contacts of a plurality of said breaker poles, said means at any position of said multiple pole breaker permitting tripping and opening of one or more of said breaker poles, an operating motor having predominantly series motor characteristics, and automatic means operatively interconnecting said motor and said common operating means, said means constituting a self-adjusting artificial load, the amount of said artificial load having an inverse relation to the real load consisting of the number of breaker poles simultaneously to be closed, whereby a single breaker pole or several of said poles together can be closed in substantially the same closing time.

4. A multiple pole circuit breaker comprising a plurality of individually operable breaker poles each having separable circuit controlling contacts and tripping means for controlling opening of said contacts, and operating mechanism for said breaker poles including movable structure common to all said breaker poles, said structure being adapted when actuated simultaneously to close the contacts of all open breaker poles, said structure at any position of said multiple pole breaker being in an unobstructing position with respect to tripping and opening of one or more of said breaker poles, an operating motor having predominantly series motor characteristics, and automatic brake means operatively associated with said motor and said common operating structure, said brake means being adapted to apply a retarding force to said motor proportional to the increase in speed of said motor above a predetermined value whereby one or more of said breaker poles can be closed or gang-closed by said motor at substantially similar speeds.

5. A multiple pole circuit breaker comprising a plurality of individually operable breaker poles, each having separable circuit controlling contacts and tripping means for controlling opening of said contacts, and operating mechanism for each and all said breaker poles including a member common to all said breaker poles, said member being adapted when actuated to gang-close the contacts of any breaker poles that are open, said member not interfering with the tripping and opening of any breaker poles that are closed, an operating motor having predominantly series motor characteristics for actuating said member, and an automatic brake operatively connected to said motor, said brake being adapted to apply a retarding force to said motor related to the increase in speed of said motor above a predetermined value whereby one or more of said breaker poles can be closed or gang-closed by said motor at substantially the same speed.

6. A multiple pole circuit breaker comprising a plurality of individually operable breaker poles, each having separable circuit controlling contacts and tripping means for controlling opening of said contacts, and operating mechanism for each and all said breaker poles including a member common to all said breaker poles, said member being adapted when actuated to gang-close the contacts of any breaker poles that are open, said member not interfering with the tripping and opening of any breaker poles that are closed, an operating motor having predominantly series motor characteristics for actuating said member, and means associated with said motor for maintaining the closing speed substantially the same whether a single breaker pole is to be closed or a plurality of said breaker poles together are to be gang-closed.

7. A multiple pole circuit breaker comprising a plurality of individually operable breaker poles each having separable circuit controlling contacts and tripping means for controlling opening of said contacts, and operating mechanism for said breaker poles including means common to all said breaker poles, said means being adapted when actuated to gang-close the contacts of one or more of said breaker poles, said means also adapted to permit individual tripping and opening of one or more of said pole breakers, an operating motor having predominantly series motor characteristics for actuating said common operating means, and an automatic brake operatively connected to said motor, said brake having centrifugal means adapted to apply a retarding force to said motor proportional to the increase in speed of said motor above a predetermined value whereby said breaker poles can be gang-closed by said motor at substantially the same speed regardless of the number of poles to be closed.

8. A multiple pole circuit breaker comprising a plurality of individually operable breaker poles each having separable circuit controlling contacts and tripping means for controlling opening of said contacts, and operating mechanism for said breaker poles including means common to each of said poles, said means being adapted to close or gang-close the contacts of one or more of said breaker poles, said means in the closed circuit position of said multiple pole breaker permitting selective tripping and opening of one or more of said breaker poles, an operating motor having predominantly the characteristics of a series motor, and an automatic brake operatively interconnecting said motor and said common operating means, said brake having centrifugally operated brake shoes rotatable by said motor and adapted to transmit torque to the breaker load and apply to said motor a self-adjusting retarding force increasing with the increase in speed of said motor above a predetermined value whereby one or more of said pole breakers can be closed or gang-closed by said motor at substantially the same speed.

WINFIELD A. ATWOOD.